United States Patent
Baier et al.

(10) Patent No.: US 7,330,473 B1
(45) Date of Patent: Feb. 12, 2008

(54) SYSTEM AND METHODOLOGY PROVIDING NETWORK DATA EXCHANGE BETWEEN INDUSTRIAL CONTROL COMPONENTS

(75) Inventors: John Joseph Baier, Mentor, OH (US); Douglas Francis McEldowney, Medina, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1021 days.

(21) Appl. No.: 10/234,504

(22) Filed: Sep. 4, 2002

Related U.S. Application Data

(60) Provisional application No. 60/372,564, filed on Apr. 12, 2002.

(51) Int. Cl.
| | |
|---|---|
| H04L 12/28 | (2006.01) |
| H04L 12/56 | (2006.01) |
| H04J 3/16 | (2006.01) |
| H04J 3/22 | (2006.01) |
| G05B 15/00 | (2006.01) |

(52) U.S. Cl. .................... 370/401; 370/466; 700/1
(58) Field of Classification Search ............... 370/466, 370/401; 700/1
See application file for complete search history.

(56) References Cited

U.S. PATENT DOCUMENTS

| | | | |
|---|---|---|---|
| 5,122,948 A | 6/1992 | Zapolin | |
| 5,611,059 A | 3/1997 | Benton et al. | |
| 5,710,885 A | 1/1998 | Bondi | |
| 5,844,794 A | 12/1998 | Keeley | |
| 5,845,149 A | 12/1998 | Husted et al. | |
| 5,978,568 A | 11/1999 | Abraham et al. | |
| 6,279,113 B1 | 8/2001 | Vaidya | |
| 6,324,607 B1 | 11/2001 | Korowitz et al. | |
| 6,381,502 B1 | 4/2002 | Rudder et al. | |
| 6,400,996 B1 | 6/2002 | Hoffberg et al. | |
| 6,412,032 B1 | 6/2002 | Neet et al. | |
| 6,457,024 B1 | 9/2002 | Felsentein et al. | |
| 6,463,338 B1 | 10/2002 | Neet | |
| 6,535,926 B1 | 3/2003 | Esker | |
| 6,624,388 B1 | 9/2003 | Blankenship et al. | |
| 6,640,145 B2 | 10/2003 | Hoffberg et al. | |
| 6,651,062 B2 | 11/2003 | Ghannam et al. | |

(Continued)

FOREIGN PATENT DOCUMENTS

WO          0111586 A          2/2001

OTHER PUBLICATIONS

Vasudevan, A Web Services Primer, Apr. 4, 2001, XML.com, http://webservices.xml.com/pub/a/ws/2001/04/04/webservices/index.html.

(Continued)

*Primary Examiner*—Kevin C. Harper
(74) *Attorney, Agent, or Firm*—Amin Turocy & Calvin LLP; R. Scott Speroff

(57) ABSTRACT

The present invention relates to a system and methodology facilitating network communications between network components operative between a local network and a higher-level, remote, and/or information network in an industrial controller environment. The system includes a data exchange module that maps one or more remote network protocols to one or more local network protocols. The data exchange module can include one or more mapping components that map a plurality of control protocols communicated over an information network to a local protocol that can be subsequently employed to communicate data to a plurality of local network devices in the industrial controller environment.

25 Claims, 8 Drawing Sheets

U.S. PATENT DOCUMENTS

| | | |
|---|---|---|
| 6,675,226 B1 | 1/2004 | Nair et al. |
| 6,691,159 B1 | 2/2004 | Grewal et al. |
| 6,708,074 B1 | 3/2004 | Chi et al. |
| 6,714,974 B1 | 3/2004 | Machida |
| 6,728,262 B1 * | 4/2004 | Woram ...................... 370/466 |
| 6,732,165 B1 | 5/2004 | Jennings, III |
| 6,732,191 B1 | 5/2004 | Baker et al. |
| 6,819,960 B1 | 11/2004 | McKelvey et al. |
| 6,891,850 B1 | 5/2005 | Vandesteeg et al. |
| 6,895,532 B2 | 5/2005 | Raynham |
| 6,904,600 B1 | 6/2005 | James et al. |
| 6,907,302 B2 | 6/2005 | Karbassi |
| 6,965,802 B2 | 11/2005 | Sexton |
| 6,968,242 B1 * | 11/2005 | Hwu et al. .................... 700/82 |
| 6,970,913 B1 | 11/2005 | Albert et al. |
| 6,982,953 B1 | 1/2006 | Swales |
| 7,032,045 B2 | 4/2006 | Kostadinov |
| 7,103,428 B2 | 9/2006 | Varone et al. |
| 7,133,900 B1 | 11/2006 | Szeto |
| 2002/0046239 A1 | 4/2002 | Stawikowski et al. |
| 2002/0065898 A1 | 5/2002 | Leontiev et al. |
| 2002/0068983 A1 | 6/2002 | Sexton |
| 2002/0073236 A1 | 6/2002 | Helgeson et al. |
| 2002/0107904 A1 | 8/2002 | Talluri et al. |
| 2002/0156872 A1 * | 10/2002 | Brown ...................... 709/219 |
| 2002/0156926 A1 | 10/2002 | Batke |
| 2002/0161745 A1 | 10/2002 | Call |
| 2003/0009253 A1 | 1/2003 | McIntyre et al. |
| 2003/0009572 A1 | 1/2003 | Thurner |
| 2003/0051074 A1 | 3/2003 | Edwards |
| 2003/0105535 A1 * | 6/2003 | Rammier ...................... 700/17 |
| 2003/0208545 A1 | 11/2003 | Eaton et al. |
| 2005/0038528 A1 | 2/2005 | McKlvey et al. |
| 2005/0055429 A1 | 3/2005 | Abele |
| 2005/0080799 A1 | 4/2005 | Harnden et al. |
| 2005/0125441 A1 | 6/2005 | Clemens et al. |

OTHER PUBLICATIONS

European Search Report dated Mar. 18, 2004 for European Patent Application Serial No. 03026339, 3 Pages.

Compuquest, Inc., SPM-IM-Instant Messaging Client for SpreadMsg Wireless Messaging Software, http://www.compuquestinc.com/spmim.html.

COMPUQUEST, Inc., SpreadMsg Lite—Data Capture, Scanning, Extraction & Rule Based Instant Messaging Software, http://web.archive.org/web/20020813080848/http://www.compuquestinc.com/spmsgl.html.

International Business Machines Corporation, Cross platform instant messaging using web services, Research Disclosure, Kenneth Mason Publications, Hampshire. GB, vol. 458, No. 156, Jun. 2002.

W3C, Web Services Description Language, http://www.w3.org/TR/wsdl.

* cited by examiner

SYSTEM AND METHODOLOGY PROVIDING NETWORK DATA EXCHANGE BETWEEN INDUSTRIAL CONTROL COMPONENTS

REFERENCE TO RELATED APPLICATION

This application claims the benefit of U.S. Provisional Patent Application Ser. No. 60/372,564, which was filed Apr. 12, 2002, entitled SYSTEM AND METHODOLOGY PROVIDING NETWORK DATA EXCHANGE BETWEEN INDUSTRIAL CONTROL COMPONENTS.

TECHNICAL FIELD

The present invention relates generally to industrial control systems, and more particularly to a system and methodology to facilitate data transfers between a plurality of industrial control components that communicate according to various network protocols.

BACKGROUND OF THE INVENTION

Industrial control systems have enabled modern factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control. Communications have also been integrated within the systems, whereby many industrial controllers can communicate via network technologies such as Ethernet, Control Net, Device Net or other network protocols and also communicate to higher level computing systems. Industrial controllers utilize the aforementioned technologies along with other technology to control multiple applications ranging from complex and highly distributed to more traditional and repetitious applications.

At the core of the industrial control system, is a logic processor such as a Programmable Logic Controller (PLC). Programmable Logic Controllers are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

Various remote applications often attempt to update and/or acquire PLC information or related device information via a plurality of different, competing and often incompatible network technologies. One attempt to standardize these competing technologies has been provided by the OLE for Process Control (OPC) Foundation that is supported by many leading controls and software manufacturers. Thus, manufacturers that support such communications standards can develop modules that communicate with other controllers/modules and/or networks. In view of emerging communications standards such as OPC, common communications architectures have developed. These architectures generally include a processor or PLC communicating on a local or factory network in accordance with an associated manufacturer's proprietary communications protocol. If a subsequent communications is desired to another network (e.g., transfer data from the local network to another network), a communications module is generally coupled to the processor, wherein the proprietary protocol is converted or translated to a subsequent network protocol.

This type of architecture requires the processor or PLC to first gather local network data before transferring the data to the communications module for subsequent transfer to other networks. Unfortunately, including the PLC in the communications path can cause performance problems, increase system expenses, and increase the amount of time required to interface systems that are designed by different control manufacturers. One such problem relates to providing increased horsepower on the PLC to handle potential communications that may occur since the data to be acquired may originate from another network device rather than the PLC. In addition, bottlenecks may occur within the PLC since communications from the local network are routed though the PLC. If the PLC is operating a complex and/or tightly controlled process, system performance (e.g., program execution time) may suffer if communications are significantly increased through the PLC.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate data communications between various industrial control system networks and/or network components in an industrial controller environment. A data exchange module is provided that maps data between a plurality of network devices and/or protocols while mitigating communications interactivity with an industrial controller such as a Programmable Logic Controller (PLC). As an example, although data can be exchanged with the PLC and transported to other networks or devices via the data exchange module and in accordance with the present invention, network devices that are controlled by or associated with the PLC can exchange information with other network devices and/or networks without employing the PLC as an intermediary for the communications—thus, mitigating bottleneck problems and/or communication performance requirements in the PLC. This also mitigates time to integrate or interface communications between diverse and/or different network systems.

In accordance with one aspect of the present invention, the data exchange module is associated with one or more mapping components that map data from local factory/network environments to broader communications environments that may be associated with a plurality of different protocols and/or control system manufacturers. In one aspect, data communications are mapped in a configuration file between the data exchange module and a local network environment. The configuration file can include a plurality of topics and associated items that define data to be exchanged with other networks, protocols, and/or systems. Topics can define local network communications devices or addresses that produce and/or receive data in conjunction with the data exchange module. Items define data elements or types that are associated with the respective topics and are configured to send and/or receive data of various types and forms to/from the devices that are referred to by the topics.

After the topics and related items have been configured, another mapping is configured to map the topics and items to other network devices that reside on different or remote networks from the local factory environment. In this manner, a data exchange can be established between local network devices and remote networks via the data exchange module and associated mappings—without communicating through an associated PLC to the local network devices. The data exchange module can employ a plurality of control protocols that can be communicated over an information network such as the Ethernet to facilitate interfacing with various systems. The control protocols can include OLE Process Control (OPC) Protocols for data exchange with client and server systems on the information network which facilitates communications between disparate networks and protocols offered by a plurality of control manufacturers. Other control protocols can include Control and Information Protocols (CIP) and Client and Server Protocols (CSP). Mappings in the data exchange module then facilitate communications between the control protocols and local network protocols via local CIP commands to various networks and/or devices. Local network protocols can include Ethernet/IP, Control-Net, DeviceNet, Data Highway (DH)/DH+, CIP and/or other protocols.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology providing network communications between local and remote network architectures in an industrial control environment. A data exchange module or component provides communications between various network architectures and can be adapted to provide OPC (OLE for Process Control) functionality including OPC data exchange (OPC DX) with other OPC or network devices via an information network such as the Ethernet. OPC Data Exchange and/or other protocols facilitate communications among different systems in a multi-vendor plant, for example, wherein a local controller such as a PLC does not have to be employed as a conduit for such communications. The data exchange module can reside in an industrial controller chassis and provide one or more network communications channels such as for interfacing to the Ethernet and/or other network. Communication configuration for the data exchange module can include "relationship-mapping" functionality between a plurality of different devices on variously configured communications networks.

Figure 1:
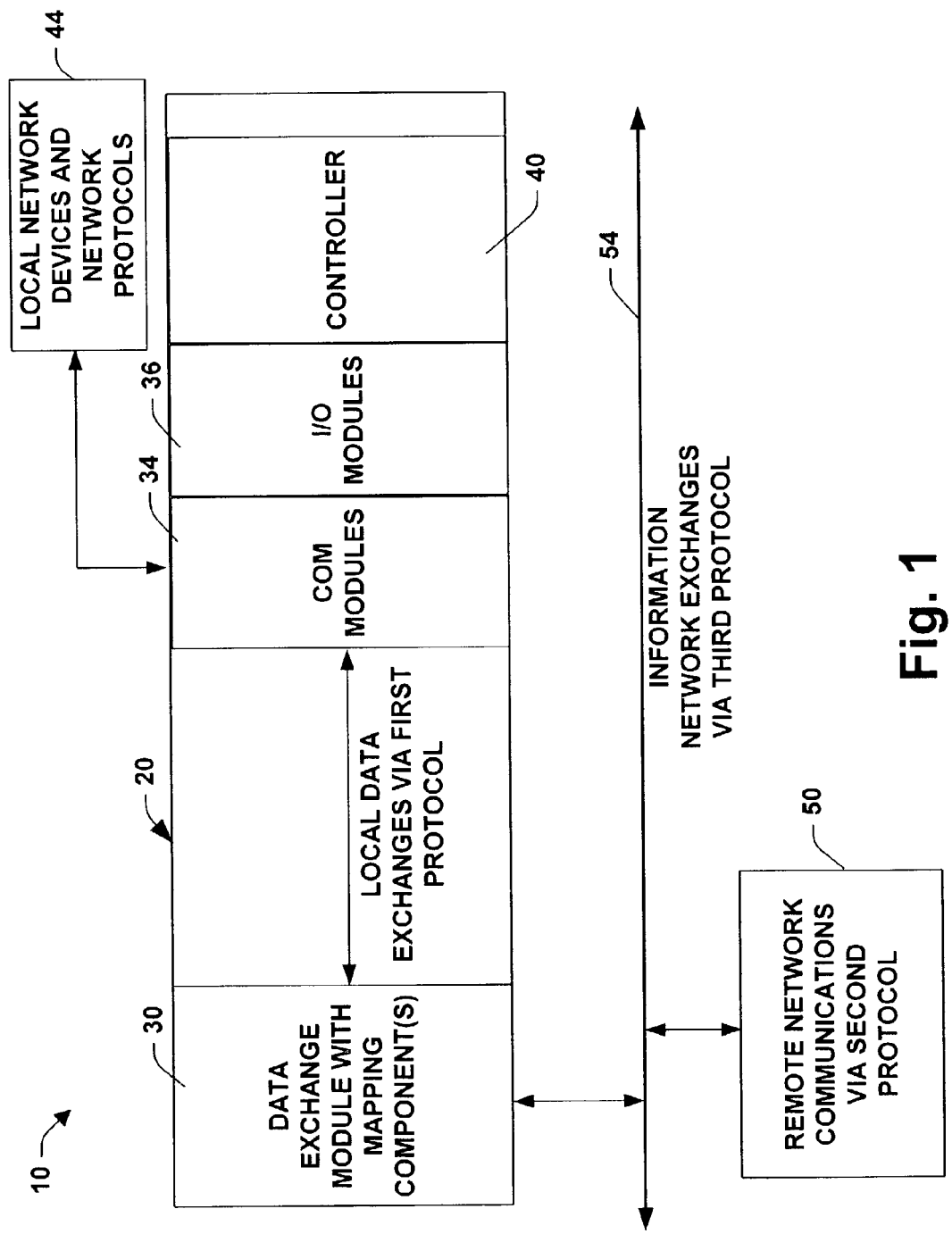
FIG. 1 is a schematic block diagram illustrating an industrial controller and communications architecture in accordance with an aspect of the present invention.

Referring initially to FIG. 1, an industrial control and communications architecture 10 is illustrated in accordance with an aspect of the present invention. A controller chassis 20 is illustrated that includes a data exchange module 30 communicating to one or more other modules such as one or more communication modules 34, one or more Input/Output (I/O) modules 34, and an industrial controller 40 (or controllers not shown). The data exchange module 30 communicates across the chassis 20 via a local bus (not shown) and in accordance with a first network protocol. As will be described in more detail below, the data exchange module 30 includes one or more mapping components to establish communications with modules in the local chassis 20 and/or to modules or devices located in a local network or networks 44. Employing the first protocol in the chassis 20 and an associated mapping, the data exchange module 30 communicates to the local network 44 via the first protocol and a plurality of variously configured communications or network modules 34 that are described in more detail below. The local network 44 can also include other I/O modules, network devices, communications modules and controllers.

It is noted that the data exchange module 30 can establish communications with any respective module in the chassis 20 and/or in the local network 44 without first employing the controller 40 (other than sending/retrieving data to/from the controller itself) to transfer data to/from the respective modules 34-36 and/or local network 44. It is further noted that a plurality of various configurations are possible with the present invention. For example, the communications modules 34, I/O modules 36, controller 40, and local network 44 can be optionally included or absent in other possible configurations.

When communications have been established between the data exchange module 30 and selectively mapped modules, devices and/or networks 34-44, a second mapping can occur to establish communications with remote networks/devices at 50 via a second network protocol. The second mapping establishes a data exchange between the remote devices 50 and the local devices 34-44 through the data exchange module 30. The second network protocol can be communicated over an information network 54 (e.g., Ethernet, Internet) to the data exchange module 30, wherein the second protocol can be communicated or encapsulated within a third network protocol employed by the information network 54.

Figure 2:
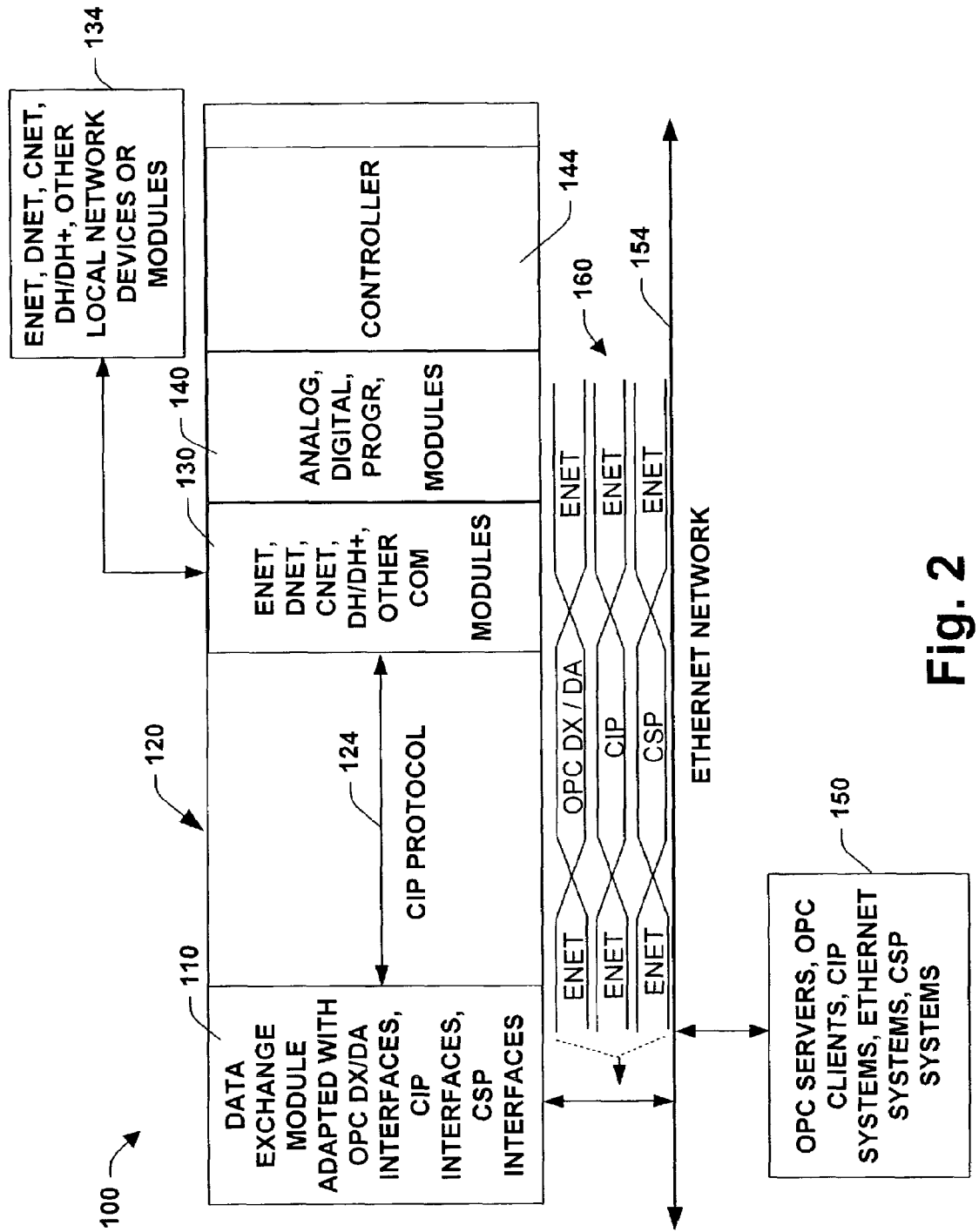
FIG. 2 is a schematic block diagram illustrating an industrial controller network architecture and associated protocols in accordance with an aspect of the present invention.

Referring now to FIG. 2, a system 100 illustrates more detailed communications and protocol aspects of the present invention. A data exchange module 110 is adapted to communicate across a chassis 120 according to a Control and Information Protocol (CIP) 124, wherein the data exchange module 110 includes processing, memory, hardware, interface and/or software aspects (e.g., drivers, components) to communicate across the chassis 120 and/or to remote networks. Control and Information Protocol 124 is a message-based protocol that implements a relative path to send a message from one or more "producing" devices to one or more "consuming" devices. The producing device can include path information that directs the messages to reach the consumers. Since the producing device holds the path information, other devices along the path can also pass the path information.

One or more communications modules 130 are adapted to receive CIP commands 124 from the data exchange module 110 and to interact with local network devices 134. The communications modules 130 can include Ethernet/EthernetIP, DeviceNet, ControlNet, DH/DH+, and/or other communications modules such as RS-232, 422 or DH-485, for example. The local network devices 134 can further include network devices and/or networks adapted to communicate with the respective networks and communications modules described above. Other modules in the local chassis 120 and/or at the local network 134 can include Analog, Digital, and/or Programmed/Intelligent I/O modules 140 and can include one or more programmable controllers 144.

The data exchange module 110 can be adapted with a plurality of communications interfaces to interact and communicate with remote network components at 150 and across an information network such as an Ethernet 154. Communications interfaces in the data exchange module 110 can include Ethernet components, CIP interfaces, Client Server Interfaces (CSP) and OPC Data Exchange and Data Access interfaces (DX, DA) in order to facilitate communications with the remote network components 150.

OPC (OLE for Process Control) is an industry standard created in accordance with a collaboration of a number of leading worldwide automation and hardware/software suppliers working in cooperation with a major software vendor. One purpose of the OPC solution is to provide plug-and-play software technology for process control and factory automation, wherein systems, devices and drivers can freely connect and communicate. The OPC DX standard is an extension of existing OPC Data Access technologies. It facilitates data exchange during run-time and is generally independent of the real-time application protocol that is being employed. It also defines a common standard for configuration of OPC DX servers and OPC clients. CSP is another protocol that can also be employed as an information exchange technology across such networks as the Ethernet 154.

The data exchange module 110 communicates with the remote network components across the Ethernet 154 or other network via a plurality of protocols illustrated at 160. The protocols 160 cooperate and are communicated with higher-level network protocols such as the Ethernet, TCP/IP, Internet and/or other network protocols. As illustrated at 160, Ethernet protocols can encapsulate or transport remote network protocols such as OPC DX protocols, OPC DA protocols, CIP protocols, and/or CSP protocols. In accordance with the protocols 160, remote network devices at 150 can communicate through the data exchange module 110 via associated interfaces/mappings to respective components 130 through 144, if desired. The remote network components 150 can include OPC servers and/or Clients as noted above, other CIP systems, Ethernet systems, and/or CSP systems.

Figure 3:
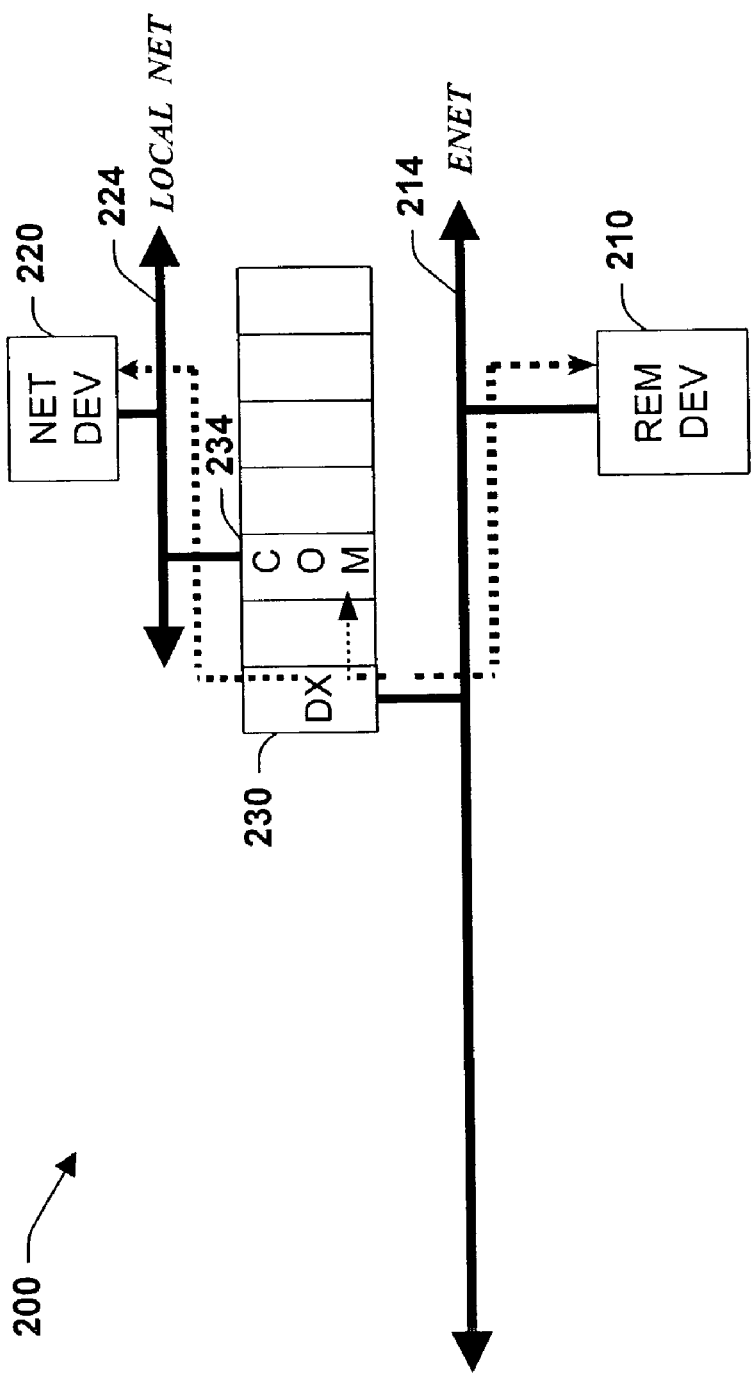
FIG. 3 is a schematic block diagram illustrating a data exchange path in accordance with an aspect of the present invention.

Turning to FIG. 3, a system 200 illustrates an exemplary data exchange path in accordance with an aspect of the present invention. As illustrated, a remote network device 210 can send and receive data via an Ethernet 214 to a local device 220 operating on a local network 224. A data exchange module 230 interfaces with a plurality of protocols from the Ethernet 214 as described above and initiates a CIP message to a communications module 234 that is adapted to the communications protocol of the local network 224. In this manner, the data exchange module 230 facilitates communications between the remote device 210 and the local device 220 without first routing through a controller or processor module (not shown).

The data exchange module 230 can be configured as a one-slot module that communicates OPC and other protocols over the Ethernet 214 or other network. The module 230 is software configurable, adapted for Removal and Insertion Under Power, and capable of flash firmware upgrades. OPC communications are provided with other OPC devices (illustrated below) on the Ethernet 214 for sharing data. These OPC devices can be OPC DA/DX servers and/or OPC DX/DA clients. Data being "served" to other OPC devices by the module 230 can be from a controller or other module residing on a local network, a local backplane, and/or a controller/device residing on a network such as a DH+ network accessible by the module.

Figure 4:
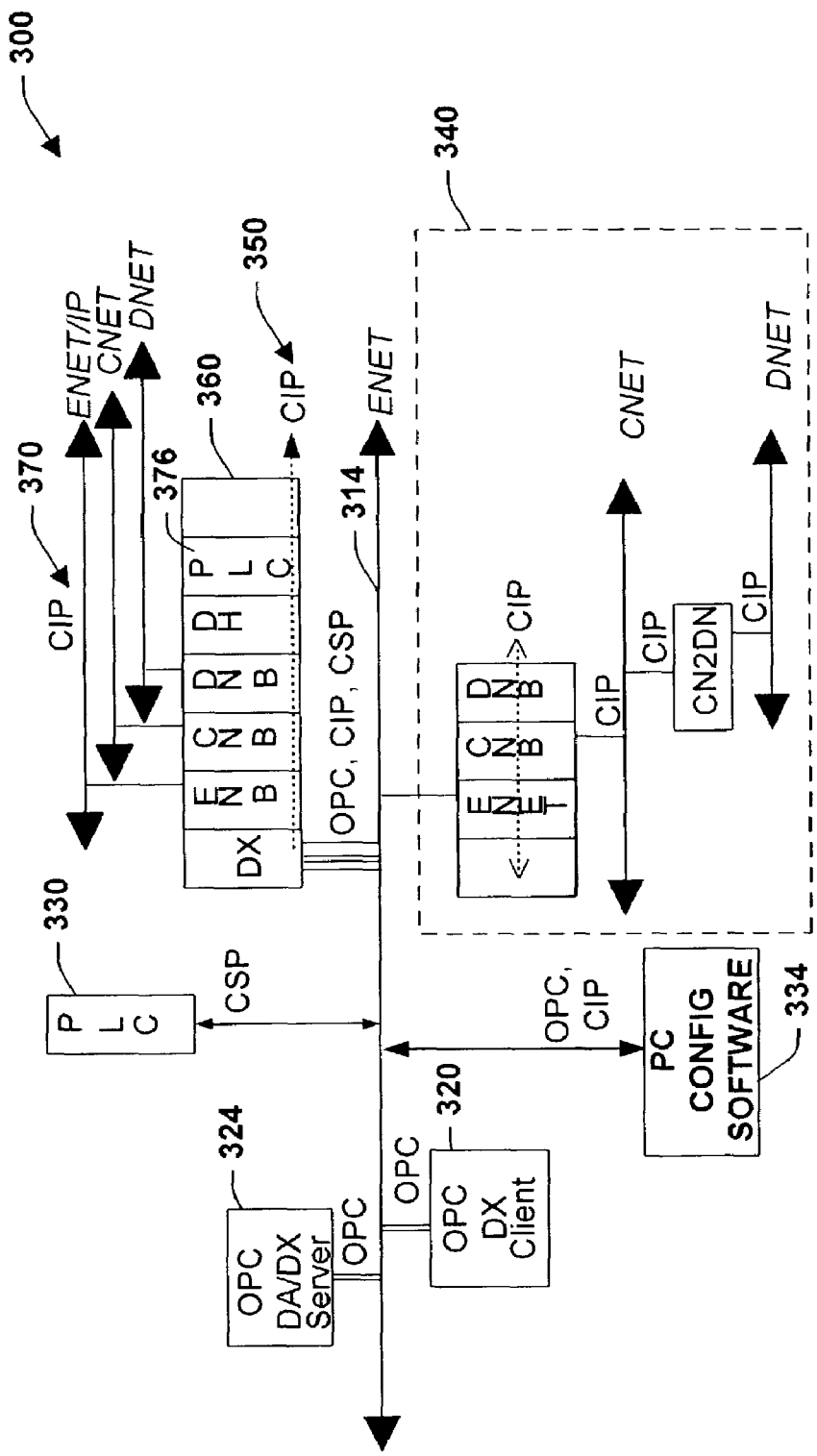
FIG. 4 is a schematic block diagram illustrating an exemplary data exchange network in accordance with an aspect of the present invention.

Referring to FIG. 4, an exemplary data exchange network 300 is illustrated in accordance with an aspect of the present invention. A data exchange module 310 communicates with an Ethernet network 314 via Ethernet, OPC (DX/DA), CIP, and/or CSP protocols. Some possible devices that can communicate with the data exchange module 310 include OPC DA/DX clients and servers at 320 and 324 employing OPC protocols, a PLC 330 employing CSP protocols, a personal computer at 334 having configuration software and employing OPC or CIP protocols, and a CIP network 340 providing access to various devices and network protocols. When receiving communications from the devices 320-340, the data exchange module 310 initiates CIP messages at 350 to other communications modules or modules residing in a chassis 360. As illustrated, the communications modules residing in the chassis 360 can initiate communications to other networks or network devices at 370 based upon CIP commands or messages received from the data exchange module 310, associated communications module and/or a controller 376.

It is noted that the data exchange module 230 can be configured as an OPC DA server/client and/or an OPC DX server/client. This includes OPC client applications, OPC DX handling for server-to-server data exchanges, and OPC client configuration interface extensions. The client configuration provides users with a standard vendor-independent tool to configure OPC DX devices for data exchange.

FIGS. 5-8 illustrates systems, associated processes and methodologies for configuring and mapping data exchanges in accordance with the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 5:
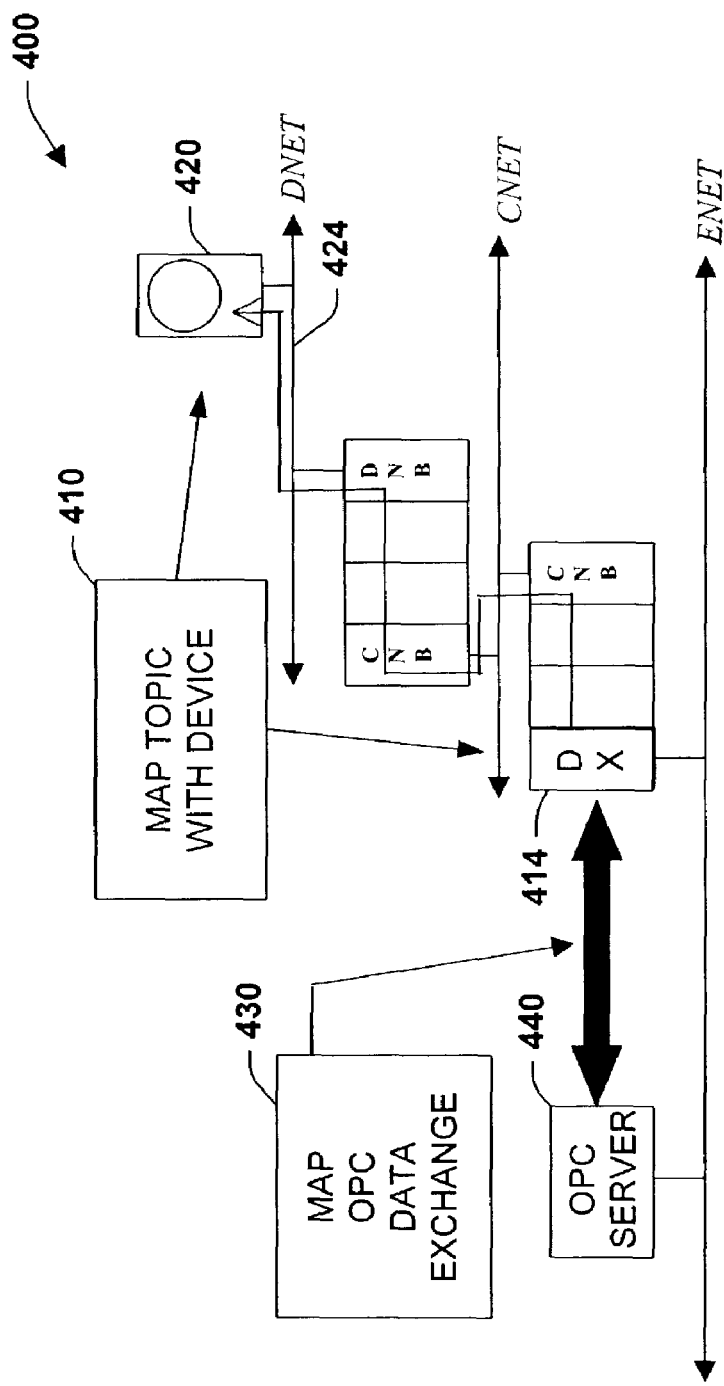
FIG. 5 is a diagram illustrating topic data exchange with a device in accordance with an aspect of the present invention.

FIG. 5 illustrates a system 400 providing a topic and data exchange with a network device in accordance with an aspect of the present invention. At 410, a topic is mapped between a data exchange module 414 and a device such as drive controller 420 operative on a CIP network 424 such as DeviceNet. At 430, a subsequent mapping maps the topic data received from the device 420 to an OPC server at 440 to facilitate a data exchange between the device 420 and the OPC server 440. It is noted that the data exchange module 414 can originate a CIP "link" not only to controllers in its local chassis but also to controllers and devices on any CIP-based networks that a logical path is available. This can also include the ability to route to DH+ and/or other networks (e.g., PCCC encapsulated CIP message).

Figure 6:
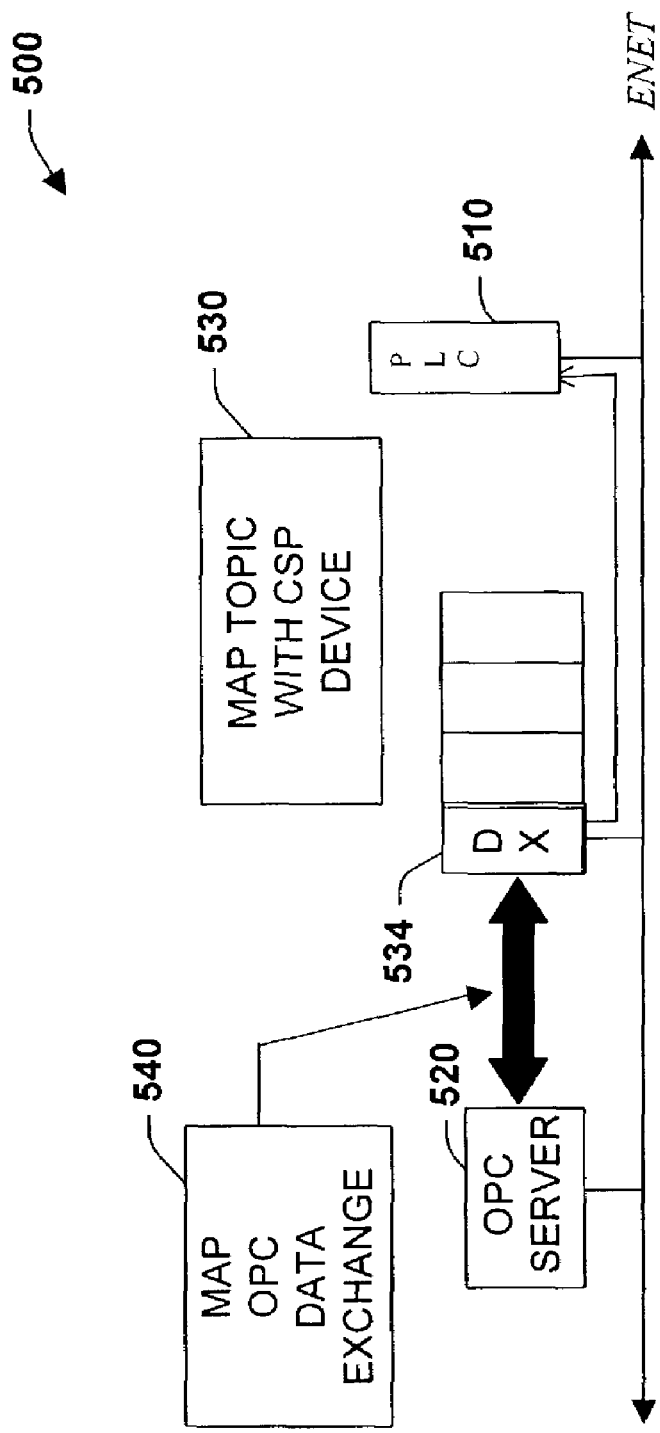
FIG. 6 is a diagram illustrating topic data exchange with a controller in accordance with an aspect of the present invention.

FIG. 6 illustrates a system 500 for topic and data exchange between a CSP device 510 and an OPC server 520. At 530, one or more topics are configured or mapped between the device 510 and a data exchange module 534. At 540, a data exchange mapping in the module 534 completes data transfers between the device 510 and the OPC server 520. It is noted many established Ethernet products utilize CSP (Client Server Protocol).

Figure 7:
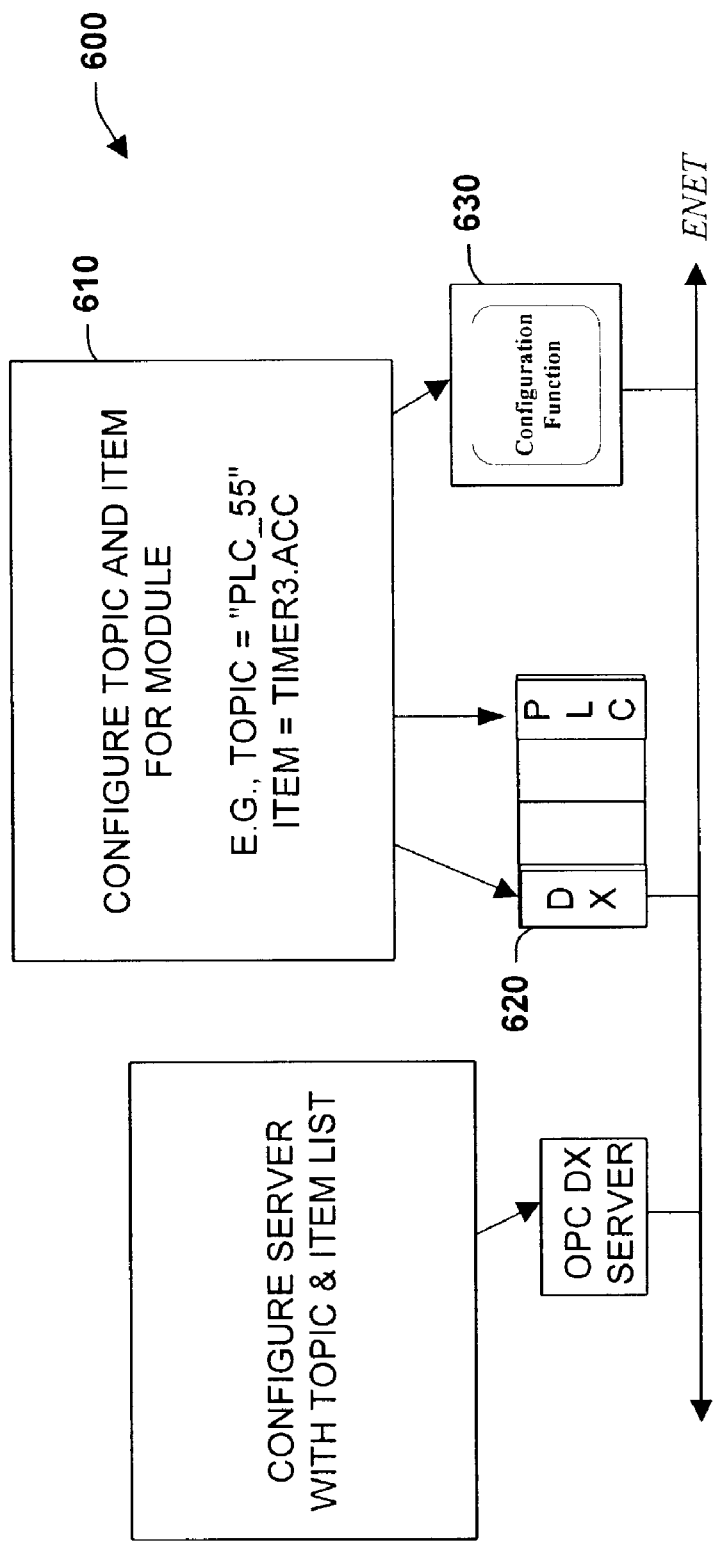
FIG. 7 is a diagram illustrating a topic item mapping process in accordance with an aspect of the present invention.
Figure 8:
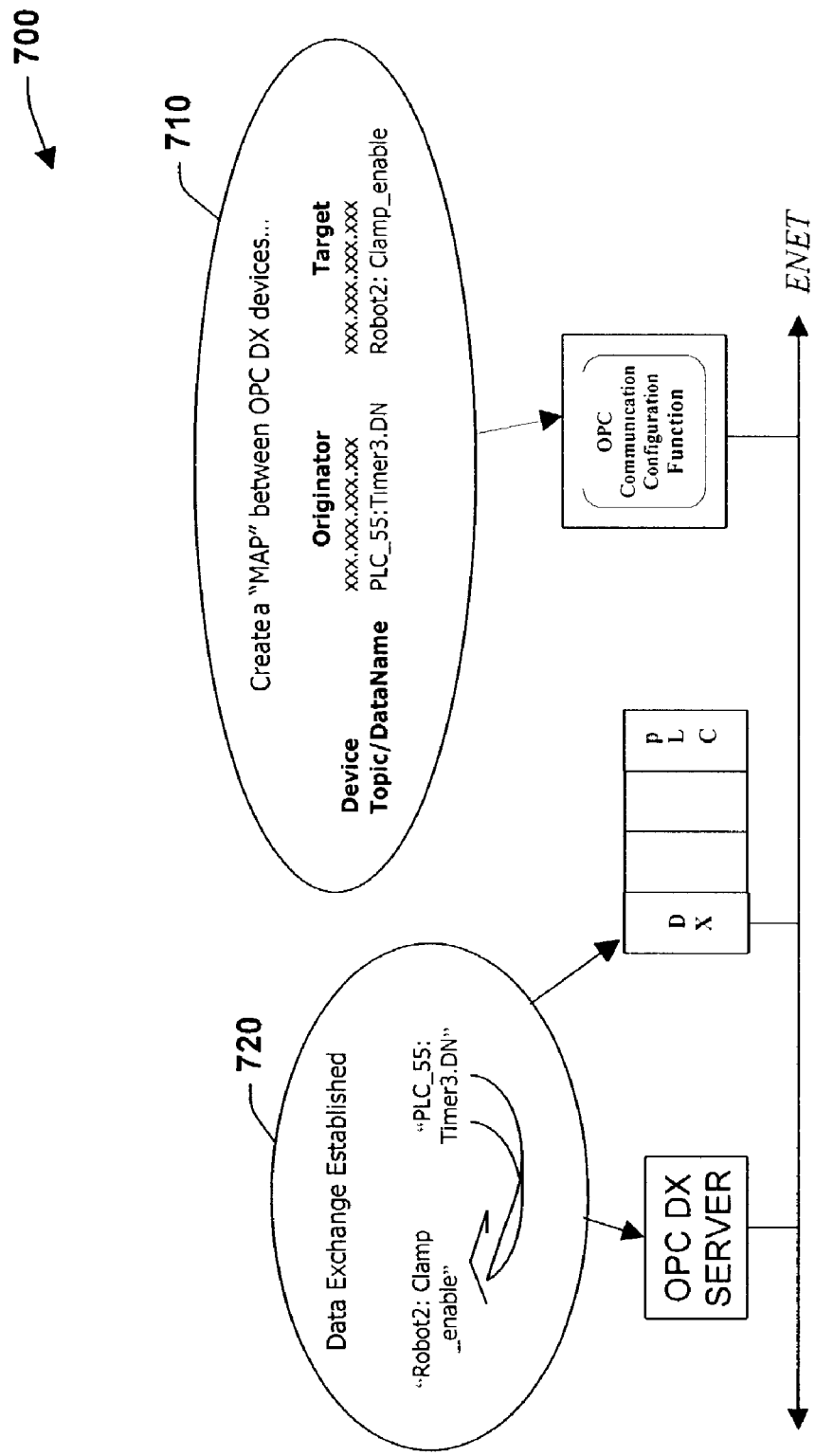
FIG. 8 is a diagram illustrating a data exchange mapping in accordance with an aspect of the present invention.

Proceeding to FIGS. 7 and 8, one or more processes are illustrated in configuring OPC and/or other communications in accordance with the present invention. At 610, topics and associated items are configured in a data exchange module 620 via a configuration function or software at 630. Topics are associated with a respective network device and/or local chassis device, whereas items include substantially any data element or type maintained by the associated topic. For example, items can include user defined tags that consist of different types of elements (e.g., SINT, INT, DINT, REAL) and/or other complex structures such as Timers, Counters, Arrays and/or other user defined tags. This can include a plurality of contiguous or non-contiguous address memory locations and can include various types of data (e.g., bit, byte, word, signed, unsigned, floating point, integer, array, structure, UDT and so forth).

When topics and items have been mapped, OPC DX data sharing "mappings" can be configured for OPC communications and data exchange in accordance with OPC specifications which are well understood and illustrated at 710 of FIG. 8. This includes an OPC DX standard defined by the OPC foundation in order that OPC DX devices can be "mapped" for data exchange regardless of associated manufacturers protocols. This can include associating a respective topic and item with an originator and target location or mapping for data exchanges at 710. In addition, device addresses can be specified for the originator and the target specified at 710. After the data exchange mapping at 710, a data exchange is established with an OPC server at 720.

The following describes one or more possible aspects for configuring and employing communications in accordance with the present invention:

Module IP address configuration—The data exchange module can be configurable as valid node on an Ethernet network or other network.

Network "Browse" and Topic configuration via network Configuration Software—This functionality enables remote configuration of topics for the data exchange module and can be provided as part of a configuration software or tool on a personal computer. This includes browsing EtherNet/IP nodes for CIP & CSP nodes as well as the capability to browse the backplane of the data exchange module to other CIP networks and nodes.

XML file creation of the Topics/Items/mappings configured for the module—This can include an offline XML file including a list of Topics and associated Items and/or data exchange mappings. An OPC communications configuration function employs this file to create "mappings" for the system.

Offline Configuration file creation—An offline file provides information and parameters of configurations in the data exchange module (e.g., module parameters and Topic configurations). This can be important in a failed module replacement situation wherein the file can be employed to restore a new module with the configurations of the replaced module to reduce downtime of the system.

Browse Topics and items configured in OPC DX servers on the Network—This facilitates online mapping configurations.

Import/Export XML files of other OPC DX devices—This facilitates offline mapping configurations.

OPC DX "Map" creation—As noted above, a configuration tool can establish mapping relationships between OPC DX servers for data exchange. This can be presented in both "Graphical Data Block" and spreadsheet formats, if desired.

Upload/Download OPC "connections" to OPC DX devices—This function enables uploading and/or downloading OPC "links" or "relationships" to DX clients so they can begin data exchange.

Recognize existing mapping relationships between DX devices—This function facilitates an upload of a data exchange "map" to an offline file. This file can be used to restore a faulted or ill-configured network.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An industrial control system, comprising:
    a data exchange module operative in a local network environment and a remote network environment;
    a first mapping component associated with the data exchange module to facilitate communications with devices associated with a controller in the local network environment in accordance with a first protocol;
    a second mapping component associated with the data exchange module to facilitate communications between devices associated with the controller in the local network environment and the devices associated with the controller in remote network environment in accordance with at least one of the first protocol and a second protocol such that communication with the controller is mitigated; and
    an offline file employed by the first and second mapping components to automatically reconfigure a replacement data exchange module, the offline file describes at least one of operating parameters and mapping configurations associated with the data exchange module.

2. The system of claim 1, further comprising a third protocol to facilitate communications between the data exchange module and the remote network environment.

3. The system of claim 2, the third protocol including an Ethernet protocol.

4. The system of claim 1, the first protocol includes a Control and Information Protocol (CIP).

5. The system of claim 1, the first protocol employed to communicate with at least one other device, the at least one other device comprising at least one of a ControlNet device, a DeviceNet device, an Ethernet/IP device, a Data Highway/Data Highway+(DH/DH+) device, a Control and Information Protocol (CIP) device, a controller device, and an Input/Output (I/O) device.

6. The system of claim 1, the second protocol including at least one of an OLE for Process Control Data Exchange (OPC DX) protocol, a Control and Information Protocol (CIP), and a Client Server Protocol (CSP).

7. The system of claim 6, the OPC DX protocol employed to exchange data with at least one of an OPC server and an OPC client component on the remote network.

8. The system of claim 1, the first mapping component further comprising at least one of a topic and an item, the topic associated with at least one local device, the item associated with at least one data type associated with the at least one local device.

9. The system of claim 8, the data type further comprising at least one of a single valued element, bit, byte, 16 bit, 32 bit, greater than 32 bit configurations, unsigned integers, signed integers, floating point elements, single dimension array, multiple dimension array configurations, and user defined tags (UDT).

10. The system of claim 1, the second mapping component including at least one of an originator device, a target device, an originator data name and a target data name.

11. The system of claim 1, the first and the second mapping components employ at least one of an online file and an offline file to facilitate communications between the local network environment and the remote network environment.

12. The system of claim 11, the first and second mapping components employ at least one of a single file and separate files to establish a mapping between the local network environment and the remote network environment.

13. The system of claim 11, the at least one of the online file and the offline file are described in an Extensible Markup Language (XML).

14. A method to facilitate data exchange in an industrial controller network, comprising:
mapping at least one of topics and items between a communications module and a local device associated with a controller;
mapping at least one remote network device associated with the controller to the communications module;
establishing a data exchange between the remote network device and the local device according to the mappings without employing the controller as an intermediary for the data exchange; and
employing an offline file that stores at least one of operating parameters and mapping configurations, to automatically configure a replacement communications module.

15. The method of claim 14, further comprising employing OLE for Process Control Data Exchange (OPC DX) protocol to facilitate the mapping of the remote network device.

16. The method of claim 14, further comprising browsing a network to facilitate remote configuration of the topics and items.

17. The method of claim 14, further comprising browsing a network to facilitate the mappings.

18. The method of claim 14, further comprising creating at least one of providing an offline file and an online file to facilitate the mappings.

19. The method of claim 18, further comprising employing the at least one of the offline file and the online file for at least one of:
configuring the mappings; and
restoring configurations on a replacement module.

20. The method of claim 14, further comprising at least one of:
providing online mappings; and
providing offline mappings.

21. The method of claim 14, further comprising at least one of importing and exporting XML files to facilitate the mappings.

22. The method of claim 14, further comprising providing a network configuration tool to facilitate the mappings.

23. The method of claim 14, further comprising at least one of uploading and downloading connection information to facilitate client communications.

24. A system to facilitate data exchange in an industrial controller network, comprising:
means for mapping data between a communications module and a local device associated with a controller;
means for mapping data between the communications module and a remote device associated with the controller;
means for communicating between the communications module and the remote device;
means for establishing a data exchange between the remote network device and the local device in accordance with the mappings such that communication with the controller is mitigated; and
means for storing at least one of operating parameters and mapping configurations associated with the communications module in an offline file employed to automatically reconfigure a replacement communication module.

25. An industrial control system, comprising:
a data exchange module operative in a local chassis, the data exchange module includes a remote network interface to communicate with at least one remote network;
a first mapping component associated with the data exchange module to facilitate communications with the local chassis in accordance with a first network protocol, the local chassis including at least one of an industrial controller, a communications module, and an Input/Output (I/O) module, the communications module communicating to at least one local network;
a second mapping component associated with the data exchange module to facilitate communications between at least one of the local chassis, the local network and the remote network in accordance with at least one of the first network protocol and a second network protocol mappings, the data exchange module facilitates communications without employing the industrial controller as an intermediary for the data exchange; and
an offline file associated with the data exchange module employed by the first and second mapping components that describes at least one of operating parameters and mapping configurations to automatically reconfigure a replacement data exchange module.

* * * * *